United States Patent [19]

Foster

[11] Patent Number: 4,706,608
[45] Date of Patent: Nov. 17, 1987

[54] INCUBATION STRUCTURE
[75] Inventor: Matthew R. Foster, Cambridge, Canada
[73] Assignee: The Marmon Group, Inc., Chicago, Ill.
[21] Appl. No.: 821,360
[22] Filed: Jan. 22, 1986
[51] Int. Cl.[4] ............................................. A01K 41/00
[52] U.S. Cl. ......................................... 119/35; 119/37
[58] Field of Search ........................ 119/35, 36, 37, 27
[56] References Cited

U.S. PATENT DOCUMENTS 3,147,737   9/1964   Theilig ................................. 119/35
3,699,924  10/1972   Hero ..................................... 119/27
4,183,325   1/1980   Destouches et al. ................. 119/37

Primary Examiner—Robert P. Swiatek
Assistant Examiner—Hugh R. Chamblee
Attorney, Agent, or Firm—Neuman, Williams, Anderson & Olson

[57] ABSTRACT

An improved poultry egg incubation structure comprising a plurality of ceiling panels, a plurality of side wall panels, a front end panel including at least one door, a rear end panel including at least one door, improved joining members for interconnecting the ceiling panels, side wall panels and end panels to form an incubation chamber, an air intake vent, an air exhaust vent, an environmental control apparatus for humidifying, heating and circulating air within the chamber, and an intake air flow control apparatus in communication with an intake air flow vent for controlling the mixing of cool external air with the heated and humidified internal air and for preventing the cool external air from flowing directly into the area of the incubation structure containing incubating eggs. The improved joining members including a corner support member, a ceiling electrical outlet assembly and a side wall gasket support member and gasket. These improved joining members simplify assembly, construction and servicing and further simplify the ability to share common side walls between separate incubation structures.

32 Claims, 8 Drawing Figures

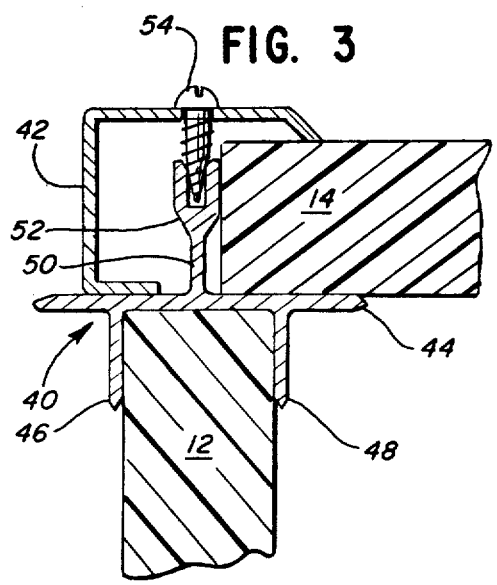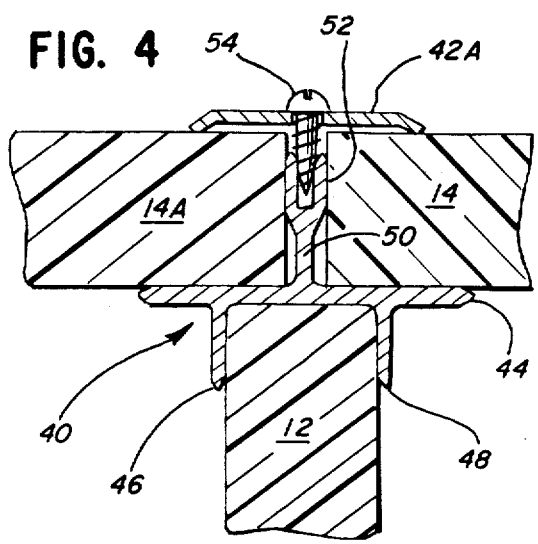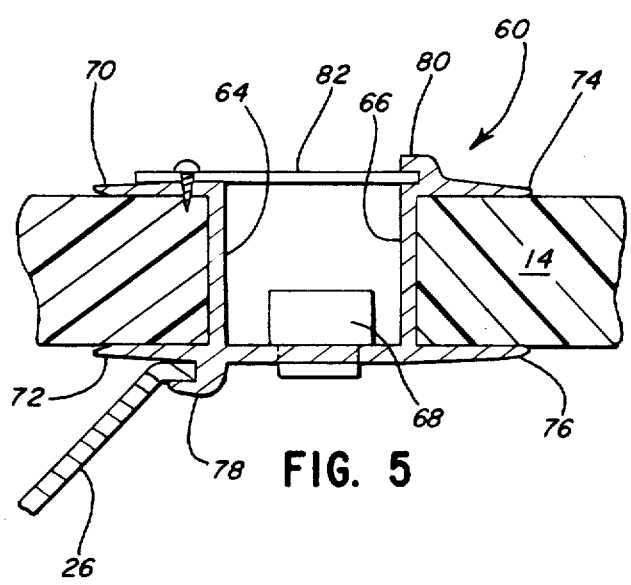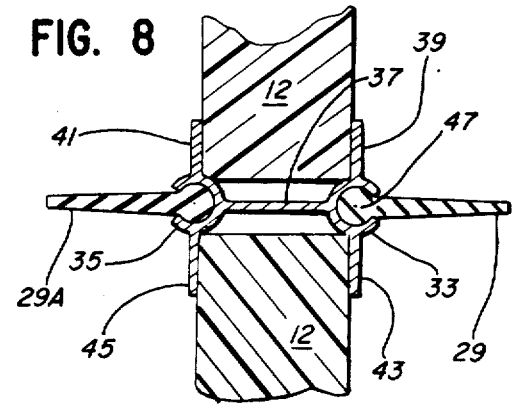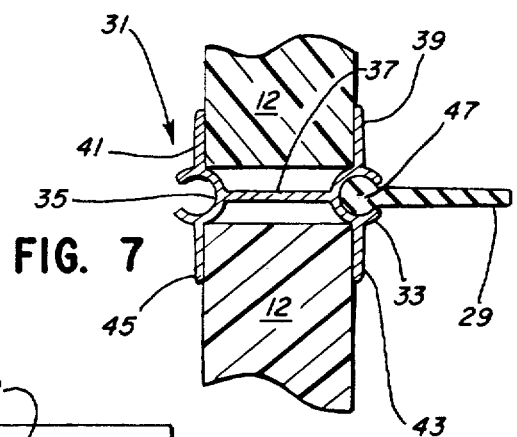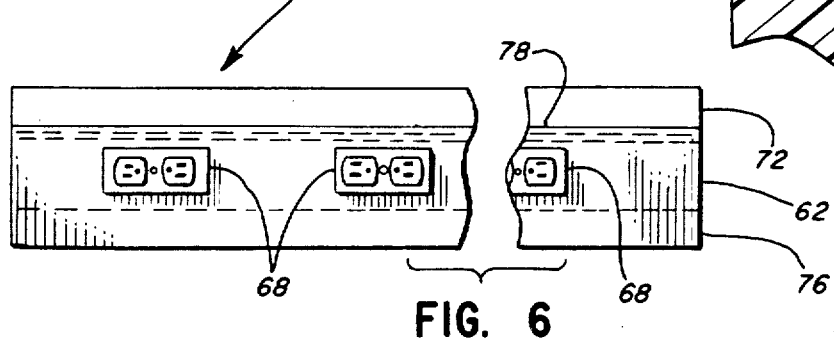

INCUBATION STRUCTURE

BACKGROUND OF THE INVENTION

Field of the Invention

This invention relates to an improved incubation structure for incubating large quantities of eggs. More particularly, this invention concerns an incubator which maintains the internal environmental consistency and the egg capacity of present systems while vastly reducing the floor space required for the unit. Additionally, this invention concerns an improved incubator structure which simplifies assembly, construction and servicing and further facilitates increasing overall capacity by providing means for simplifying the ability to share common side walls between separate incubation structures.

At the present time, an increasing demand exists to feed an expanding world population. Moreover, scientific studies have confirmed the beneficial results obtained by a person consuming less red meat. One viable solution to these problems lies in the mass production of poultry as food such as chicken and turkey. Integral to this solution is the ability to efficiently incubate and hatch mass quantities of poultry eggs. Incubation systems for this purpose, of course, have been used in hatcheries for many years. However, in order to meet the demand associated with mass production, incubation structures and incubators in general have grown to enormous proportions. The size of these incubators has created a practical problem with respect to the cost associated with these large units in proportion to the number of eggs which can be handled. Accordingly, it is desirable to provide an incubation system which is reduced in size in comparison to contemporary units while maintaining current capacity. Moreover, it is equally desirable to design these incubators for easier assembly and serviceability than is presently available.

The invention not only reduces the present size of incubators but simplifies construction and serviceability and further permits the addition of more units by providing a structure which permits the joining of subsequent incubators to a shared or common side wall with existing units. Besides decreasing floor space, this design also decreases the cost associated with expansion and results in a lower cost product for the consumer.

Both previous incubators and those of the present invention are formed from multiple wall and ceiling panels joined together in a rectangular configuration. Double doors are provided at each short end of the unit for loading or unloading the large racks which house the eggs during the incubation process. Additionally, the floor of the incubation chamber is provided with channeled or V-grooved tracks for easier handling and movement of the egg racks through the chamber. Depending on the circumstances, an actual floor containing these racks may be installed with the incubator or the tracks may be affixed to the floor of the hatchery in which the incubator is constructed. Nevertheless, previous incubation structures fail in many respects to reduce critical floor space requirements and decrease the time and labor costs associated with assembly, construction and serviceability of these incubators.

The first problem cognizant in previous systems concerns the assembly of both the initial incubation structure and additional structures or units subsequently purchased. Typically, adjacent side wall and ceiling panels were joined together by riveting "L" shaped aluminum extrusions along both the interior and exterior corners formed by these overlapping panels. This was a time and labor consuming assembly which required the exterior and interior corner extrusions to be installed separately and further required the installer to first drill holes in the extrusions and panels before the rivets could be applied. Moreover, when a second unit was acquired, this construction inhibited the second unit from sharing a common side wall with the original unit because there was not a convenient way to join the new ceiling panels of the second unit to the existing side wall and ceiling panels of the original unit. While the two incubator units could be joined to share a common wall, it was a labor and time consuming process. Consequently, even though the two incubation structures were constructed side by side, the second unit frequently did not adopt a common side wall with the original structure but retained both side walls for assembly. With the present invention, a single corner extrusion is employed which not only simplifies assembly of the original incubation structure but which further promotes the cost saving feature of sharing common side walls with subsequently installed incubation structures.

A second problem in previous incubation systems concerns the large space required in order to provide proper environmental conditions for the large number of eggs undergoing incubation. Generally, racks holding over 7,500 eggs are rolled into the incubation chamber through the double doors at the loading or front end of the chamber. A large incubator will hold 12 racks in side by side configuration forming two rows of six racks. As the racks of fully gestated eggs are removed from the exit end of the incubator, racks containing new eggs are loaded at the loading end of the chamber. Accordingly, there is a continuous progression of racks housing eggs at various stages of gestation through the incubator so that the oldest eggs are always closest to the exit end of the incubation chamber.

In order to maintain stable environmental conditions, previous incubators required a large space between the loading end of the incubator and the closest egg racks. This space was necessary for the internal air to thoroughly mix with the air drawn into the chamber from outside. Specifically, an air intake vent, positioned directly over the loading doors, provided means for drawing fresh air into the chamber. Because the chamber is maintained at a higher temperature than the air in the hatchery housing the incubator, natural convection caused the cooler outside air to travel into the vacant space and mix with the heated and humidified air in the chamber. Since the cool outside air was randomly mixed with the inside air a large mixing area was needed to assure thorough and complete mixing. Directly above the first pair of racks, attached to the ceiling, were a series of fans and means for heating and humidifying the internal air. The fans would circulate the air over the heating and humidifying elements and then over the tops of the racks to the rear or exit end of the chamber. At the same time the fans draw the heated and humidified air from the rear of the chamber across the eggs in the racks. Additionally, warm air and carbon dioxide produced by the older eggs would be combined with the heated and humidified air from the rear of the chamber to warm the newer eggs in the front of the chamber. The cycle was completed when the air being drawn across the eggs returned to the space at the loading end of the chamber to mix with the cool air entering through the air intake and descending toward the floor of the air mixing space. It was also necessary to provide an exhaust opening in the ceiling at the rear of the chamber so that air pressure inside the incubator remained stable.

Removing the necessary mixing space at the front of the chamber would effectively reduce the floor space covered by the incubator. However, under such reduced space conditions, the cool external air entering the chamber and traveling down the front end wall would flow directly onto the newest eggs. This would create an extremely unstable environment which would reduce the number of embryos that would grow and mature. Additionally, under this reduced space arrangement, the air intake vent would be adjacent the air distribution fans and this proximity would disrupt the critical air circulation and stability of the internal environment. The fans would simply draw outside air into the chamber and directly to the fans preventing the complete mixing achieved when the front air space was present. The present invention overcomes the problem associated with removing the air mixing space at the front of the chamber by attaching a three-sided vertical channel to the air intake so that the open side of the channel faces the loading or front end wall. This prevents the cool external air from immediately being drawn into the fans and further positively controls the flow of cool air into the chamber. Importantly, the channel is also spaced a small distance from the end wall so that some cool air can escape around the side of the channel as the cool air sinks to the floor of the chamber. Consequently, this structure creates an even, positive mixture of the escaping cool air with the warm, humidified air returning across the eggs under circulatory effects of the ceiling fans.

A third problem existent in previous systems was the difficulty inherent in installing and servicing the electrical system of the incubator. Particularly, for safety reasons, the wiring for the air distribution fans and heating elements were housed inside a protective channel screwed to the ceiling of the incubator. Consequently, for both installation and service, an electrician would be required to remove this protective enclosure and perform the necessary service while balancing on a ladder. Moreover, servicing the electrical system after the incubator was operating placed the electrician in the same awkward position of having to work over his head and additionally placed the eggs in close proximity thereby raising a potential for damaging the eggs as well as disrupting the internal environment of the incubator by having the doors opened or the electrician present to do repairs. The present invention overcomes this dual problem by employing an aluminum extrusion designed for placement between ceiling panels which has means on its bottom surface for attaching the series of air distribution fans and which also has a internal channel, accessible from the top of the roof of the incubator itself, for housing the electrical outlets and wiring for the fans and heating elements. Accordingly, during installation, the wiring for these elements can be done on the incubator roof and the fans and heating elements can simply be plugged into the electrical outlets on the bottom surface of the ceiling extrusion.

OBJECTS OF THE INVENTION

It is a general object of the present invention to provide an improved incubation system structure facilitating installation, assembly and service and which utilizes space more efficiently.

It is another object of this invention to provide an improved incubator structure which facilitates the sharing of common side walls between two or more incubation systems.

More particularly, it is an object of this invention to reduce the necessary floor space for the incubator by positively controlling outside air entering the incubation chamber.

It is a further object of this invention to provide improved aluminum extruded connectors for assembling the ceiling panels to the side wall panels and for installing and servicing the electrical wiring for the fans and heaters inside the incubator.

Other objects and advantages of the invention will become apparent upon reading the following detailed description and appended claims, and upon reference to the accompanying drawings.

SUMMARY OF THE INVENTION

In accordance with one embodiment of the invention an improved incubator system is provided through the use of an intake air flow which allows the square footage of the incubator to be reduced while maintaining its egg capacity. Additionally, an improved incubator system is provided through the use of novel structural connectors which simplify installation, assembly and service and further aid in reducing space requirements when additional incubators are purchased.

The intake air flow control consists of an open sided vertical channel which faces the front panel of the incubator and positively controls the intake of outside or fresh air. The channel is affixed to the ceiling at the air intake vent and is spaced slightly from the front wall. This design allows the cool, outside air to be drawn into the incubator chamber and gradually disperse and mix with the internal warm, moist air without the eggs being subject to a direct flow of cool air.

The improved structural connectors consist of a corner support member for connecting the ceiling panels to the side wall panels, and a side wall gasket support member for holding vertical gaskets used in regulating internal air circulation, and a ceiling electrical outlet assembly for housing electrical outlets and wiring for the air circulation fans and heating elements. These connectors both simplify assembly, installation and service. Additionally, the corner support member and side wall gasket support member enhance the ability of an adjacent incubator to share a common side wall with an existing incubator. The corner support member is designed and adapted to receive and support both the ceiling panels of an existing incubator structure and the ceiling panels of an adjacent incubator. The side wall gasket support member is designed for incorporation into the side walls of the incubation structure and further is designed to securely support an air flow limitation gasket protruding from each of the side wall surfaces. The ceiling electrical outlet assembly allows the installer to complete the circuits for the electrical outlets, heating elements and any other electrical devices from the top of the roof of the incubator rather than from an awkward position standing on a ladder inside the incubator.

BRIEF DESCRIPTION OF THE DRAWINGS

For a more complete understanding of this invention reference should now be made to the embodiments illustrated in greater detail in the accompanying drawings and described below by way of an example of the invention.

FIG. 3 is a cross-sectional view of the corner support member of the present invention taken along line 3—3 of FIG. 1.

FIG. 4 is also a cross-sectional view of the corner support member of the present invention but further showing a shared common side wall and two ceiling panels.

FIG. 5 is a cross-sectional view of the ceiling electrical outlet assembly of the present invention taken along line 5—5 of FIG. 1.

FIG. 6 is a bottom view of the ceiling electrical outlet assembly of the present invention taken along line 6—6 of FIG. 1.

FIG. 7 is a cross-sectional view of the side wall gasket support member of the present invention taken along line 7—7 of FIG. 1.

FIG. 8 is also a cross-sectional view of the side wall gasket support member of the present invention but further showing a shared common side wall and two air flow limitation gaskets.

It should be understood that the drawings are not necessarily to scale. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Figure 2:
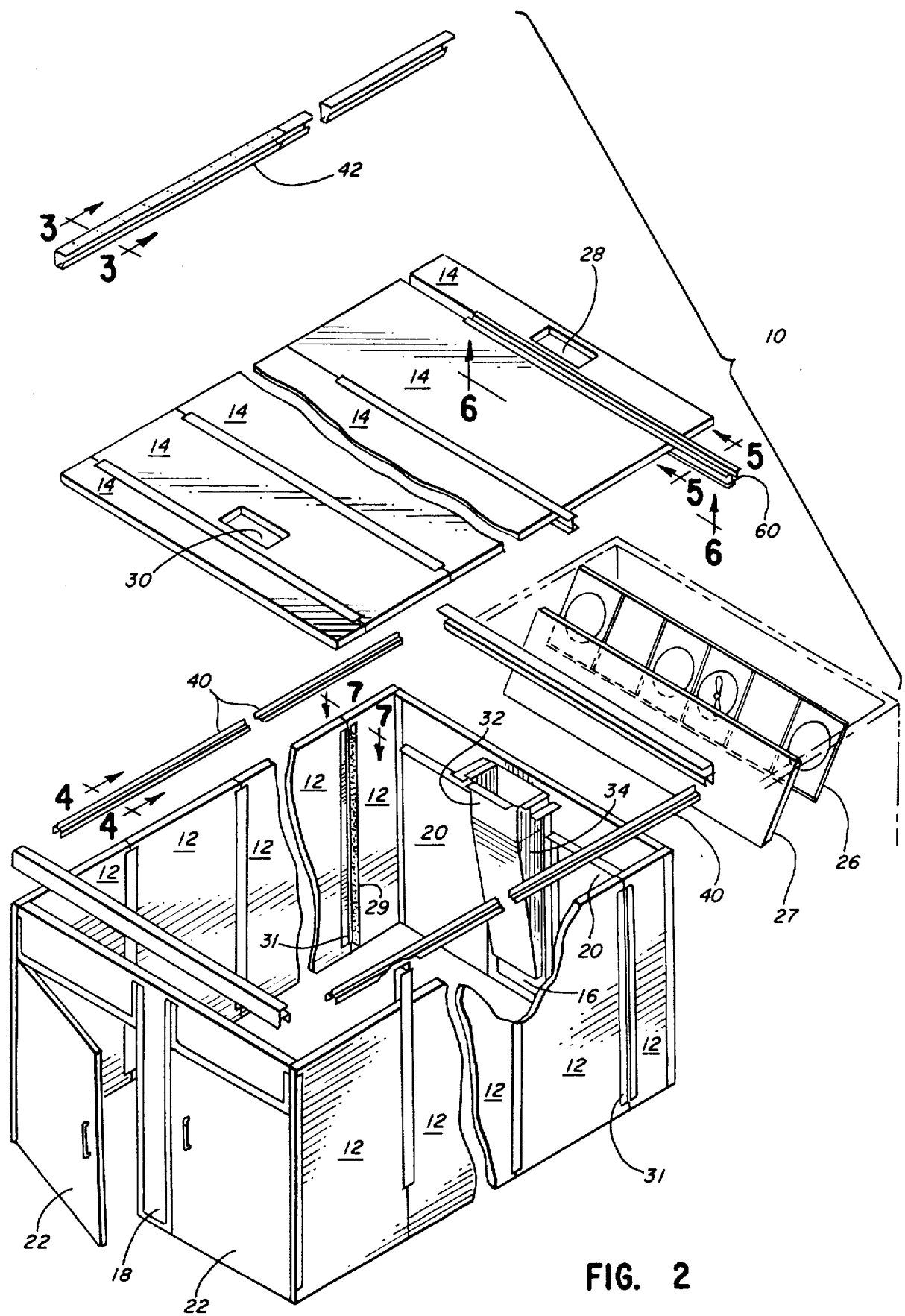
FIG. 2 is an exploded perspective view of the incubation system of this invention.

Turning first to FIG. 2 there is shown an exploded perspective view of the improved incubation structure 10 of this invention. As can generally be seen, the incubator structure 10 is defined by a plurality of insulated side wall panels 12, a plurality of insulated ceiling panels 14, two insulated end panels 16 and 18, each having a pair of doors 20 and 22 respectively, and a base 24. This basic structure is well known in the art and has been used for many years in connection with large scale incubation and hatching facilities.

The present invention, however, improves upon existing incubation structures by providing a structure which positively controls internal air intake which, in turn, allows the incubator to be constructed of reduced size. As can be seen from both FIGS. 1 and 2, a series of air circulation fans 26 are attached to the ceiling 14 of the incubation chamber. These fans 26, in combination with heating and humidifying elements 27 establish and maintain the critical internal environmental conditions necessary for incubating poultry eggs. Also essential to this task are the air intake vent 28, disposed in the ceiling 14 adjacent the front end panel 16 and the air exhaust vent 30, disposed in the ceiling 14 adjacent the rear end panel 18. External air is drawn to the chamber via the intake vent 28 and internal pressure is maintained at a constant level by evacuating air through the exhaust vent 30.

The positive intake air flow control achieved by this invention is a result of the addition of the three sided channel 32 vertically disposed along the front end panel 16 of the incubator 10. This channel 32 is attached to the ceiling 14 and directly communicates with the air intake vent 28. Additionally, the channel 32 has an open side facing the front end panel 16 and the side walls 34 of the channel are spaced slightly from the front end panel 16. In the preferred embodiment the channel side walls 34 are tapered, having the greatest width at the top. The tapered side walls cause the channel to have a large cross-sectional area at the ceiling of the chamber and a relatively shallow cross-sectional area near the floor of the chamber. This decrease in cross-sectional area is proportional to the decrease in the column of cool external air controlled by the channel as a result of the gradual escape of cool air around the channel side walls 34.

In previous incubators, cool external air was drawn into the chamber where it mixed with the warm, moist internal air. By natural convection the cooler air would descend to the bottom of the chamber and mix with the warmer internal air being drawn across the eggs by the circulation fans. However under this arrangement sufficient space had to be provided in the front of the chamber to allow for proper mixing of these two bodies of air. If the space was reduced, the cooler external air flow entering the chamber would be in direct contact with the first rack of eggs and this condition would interfere with proper incubation. Additionally, with less mixing space, less internal air would be available to balance the cooling effects of the external air.

Generally, the air distribution and circulation fans 26 push the internal air through heating and humidifying elements 27. The fans 26, then push the now heated and humidified air over the tops of the egg racks 36. Internal air circulation can be further controlled by installing vertical gaskets 29 between the inside side walls 12 of the incubator and the egg rack 36 directly below the fans 26 (See FIG. 2). These gaskets are secured in place by the side wall gasket support member 31 which, in turn, is disposed between two side wall panels 12. These gaskets prevent the internal air from circulating around the egg racks thus causing the air to flow through the egg racks and over the eggs. As the heated air reaches the rear of the chamber it is forced down the rear wall 18 wherein it is drawn through the racks 36 and across the thousands of poultry eggs.

Figure 1:
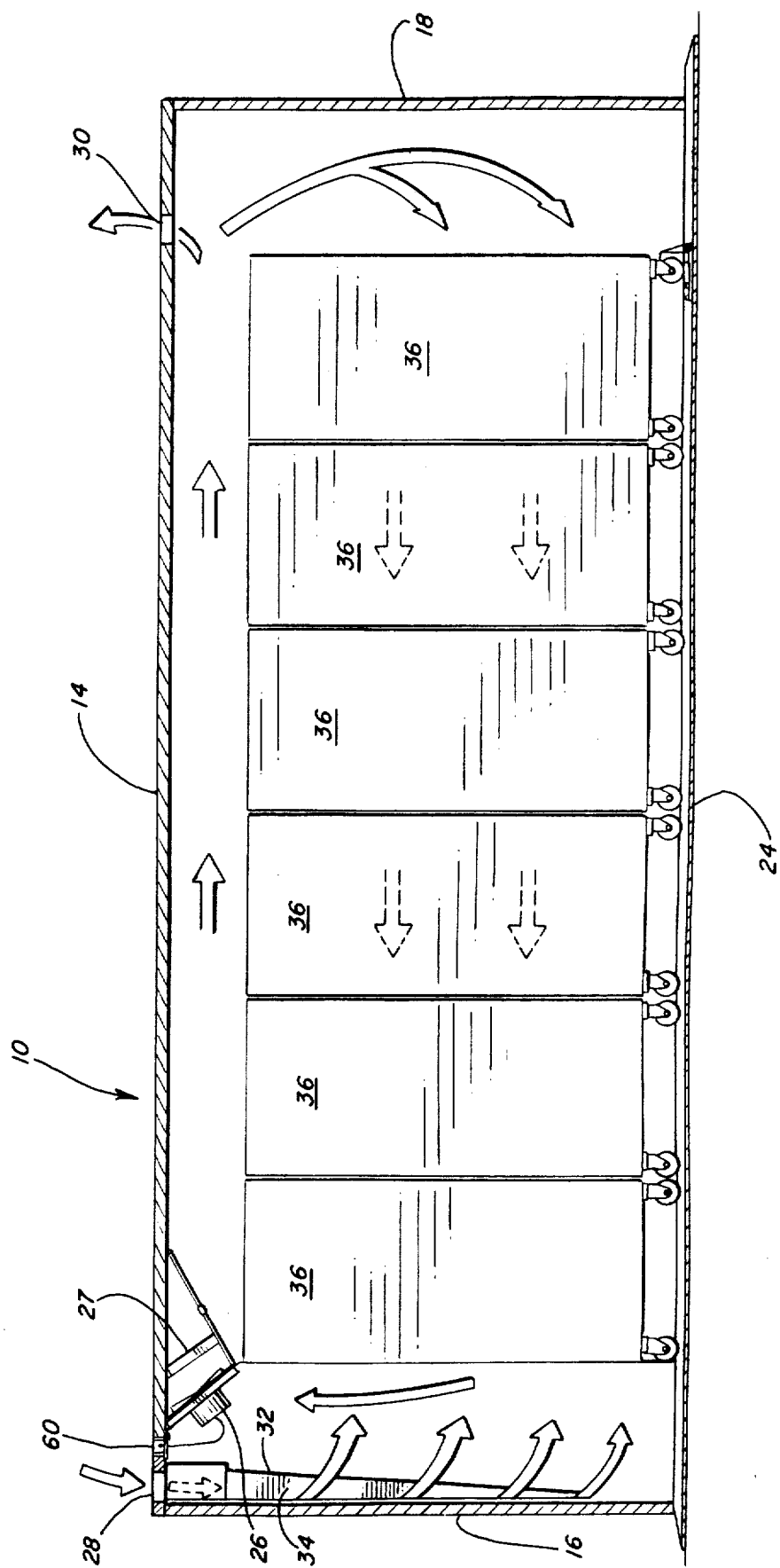
FIG. 1 is a cross-sectional side view of the incubator of this invention.

With reference to FIG. 1, the positive air intake control attributable to this invention can graphically be seen. Cool external air is drawn into the chamber as a result of both a pressure differential between the internal and external air and also as a result of the draw attributable to the air circulation fans 26. Once in the channel 32, the cooler air will begin to gradually descend and will be prevented from directly flowing onto the eggs by the channel 32. However, the vertical gaps between the side walls 34 of the channel 32 and the front end panel 16 allow a gradual supply of cool air to escape from the channel under the effects of the circulation fans 26 as the cool air naturally descends. This controlled and limited supply of cool air can then thoroughly mix with the warm, moist air returning across the eggs under the circulating effects of the fans 26. Consequently, a proper mixture of air is achieved and the internal environmental conditions are consistently maintained without subjecting the eggs to a direct flow of cool air. And importantly, the floor space of the entire incubation structure is reduced.

Further, in accordance with the invention, novel structural components are provided with the incubation system which simplify the assembly and service of the system and which further facilitate saving space and costs. One such structural subassembly is the corner support member 40. As can be seen more clearly in FIG. 3, the corner support member interconnects the ceiling panels 14 to the side wall panels 12 with the aid of a cover plate 42. The corner support member 40 is typically made as an aluminum extrusion.

As can be seen from both FIGS. 2 and 3, the corner support member 40 has a flat horizontal member 44, a pair of opposed, parallel vertical members 46 and 48 subtending said horizontal member 44 and a third vertical member 50 which bifurcates at its distal end into a receptive boss 52. While FIG. 1 shows the corner support member as one elongated piece, it is certainly contemplated that it may be made of shorter lengths.

In practice, the top edge of the side walls 12 are glued into the channel defined by the opposed, parallel vertical members 46 and 48 and the horizontal member 44. Subsequently, the side edge of the ceiling panels 14 are placed in an abutting relationship with the boss 52 and are then glued to the top surface of the horizontal member 44. Lastly, a cover plate 42 is attached to the corner support member 40 by means of a series of machine screws 54. As an alternative to gluing the ceiling panel 14 in place, a gasket may be placed beneath the ceiling panel 14 provided the cover plate 42 is properly fastened in place. The cover plate serves to both secure the ceiling panel 14 in place and to provide a safe and aesthetic finish to the external corner of the incubator structure 10.

The benefits obtained by these corner support members are readily apparent during installation. In previous systems, the method of connecting the ceiling panels to the side wall panels involved using two separate "L" shaped connectors, drilling holes in the connectors and panels and then riveting one connector to the internal corner and the other connector to the external corner. As seen in FIG. 3, the corner support assembly inherently has an internal bracket defined by members 44 and 48. Additionally, the cover plate 42 can be affixed and removed through the simple application of a few machine screws. No drilling holes is necessary and no rivets are necessary. As a result, the assembly is dramatically simplified.

A further critical advantage this structure provides over the prior art is the ability to simply and effectively add a second incubator at a significantly reduced cost and with a savings in floor space by sharing a common side wall with an existing incubator. As seen in FIG. 4, by simply removing the cover plate 42 a second group of ceiling panels 14A can be engaged by the corner support member 40. Both series of ceiling panels 14 and 14A can then be secured to the corner support member 40 by means of the modified cover plate 42A. Moreover, the original cover plate 42 (FIG. 3) can be reused by being relocated to the corner support member on the outside wall of the newly added incubator.

A second subassembly of the present invention also simplifies both construction of the incubator and the ability to share a common side wall between adjacent incubators. This subassembly comprises the side wall gasket support member 31 and vertical gasket 29. As stated previously, a vertical gasket, disposed between both side walls of the incubator and the adjacent two egg racks promotes circulation across the eggs by preventing air from circulating around the sides of the egg racks. The use of gaskets for this purpose is well known. Previous gaskets were generally "L" shaped and were either screwed or bolted into the side walls of the incubator, a process which was very time consuming. Moreover, movement of the egg racks through the chamber often resulted in the gaskets being torn from the wall. The side wall gasket support member 31 and vertical gasket 29 of the present invention alleviates this complex assembly procedure and reduces the likelihood of dislodging the gasket from the side wall.

As seen in FIG. 2, the side wall gasket support member 31 is disposed between two adjacent side wall panels 12 near the front end of the incubator. Preferably the location is directly below the air circulation fans 26. The preferred embodiment of the side wall gasket support member 31 has two channels for engaging adjacent side wall panels 12 of the incubator and two "C" shaped grooves 33 and 35 for slidably engaging the base portion 47 of the gasket 29. The grooves 33 and 35 each define an elongated slot 49 and 51 through which the finger portion 53 of the gasket 29 extends. It is the finger portion 53 of each gasket 29 which causes the air to flow across the eggs rather than around the egg racks. The two channels share a common end portion 37, and have side portions 39, 41 and 43, 45, respectively, extending outwardly from the grooves 33 and 35.

During assembly of the incubator 10, one side wall panel 12 is glued into the channel formed by end portion 37 and side portions 39 and 41. The next side wall panel 12 is then glued into the channel formed by end portion 37 and side portions 43 and 45. The side wall gasket support member is preferably made as an aluminum extrusion. The bulb end 27 of the gasket 29, typically made from rubber or similar material, is then slid into the groove 33 or 35 which is on the interior side of the chamber. Of course, it is evident that the grooves 33 and 35 are not limited to the shape disclosed in FIGS. 7 and 8 but could be extruded in other geometric shapes sufficient to securely retain a similarly shaped gasket 29.

Turning to FIG. 8 it can be seen how this side wall gasket support member 29 can simplify the ability to share common side walls between incubators. By simply sliding a second gasket 29A into the groove 35 the assembly is complete. The gasket need not be screwed or bolted to the side wall 12.

The present invention includes a still further subassembly structure which also simplifies supplies assembly and service. Referring to FIGS. 5 and 6 a ceiling electrical outlet assembly 60 is disclosed. The assembly 60 is disposed between two adjacent ceiling panels 14 (FIG. 1) near the front end 16 of the incubation system 10 (FIG. 1). Of course, this subassembly structure can be used to connect any of the ceiling panels 14 when electrical power may be needed at the internal location within the incubator chamber by simply replacing the standard I-beam assembly illustrated in FIG. 2. In essence, the assembly 60 comprises three interconnected channels. The first channel is defined by a first base portion 62 and a pair of opposed, parallel side walls 64 and 66 extending vertically therefrom. The first base portion 62 has a plurality of electrical outlets 68 spaced along its length which face into the chamber and provide electrical power to the circulator fans 26 and heating elements 27. The wiring for these outlets 68 runs through this first channel.

The second channel is defined by the first channel side wall 64, acting as a base portion, and a pair of opposed, parallel side walls 70 and 72 extending horizontally from the first side wall 64. This second channel engages one of the ceiling panels 14 in the same manner the corner support member 40 engaged the top edge of the side walls 12.

The third channel is the symmetrical opposite of the second channel. Here, the first channel side wall 66 forms the base portion and a pair of opposed, parallel side walls 74 and 76 extend horizontally from the first channel side wall 66 to complete the third channel. The channel also engages a ceiling panel 14 as is shown in FIG. 5.

Additionally, the preferred embodiment of the ceiling electrical outlet assembly 60 is provided with a curved lip 78 which protrudes from the bottom of assembly into the incubation chamber. The lip 78 receptively engages and provides a mounting bracket for the air circulator fans 26. Also, a second lip 80, disposed on the third channel side wall 74 provides a seat for receptively engaging the assembly cover plate 82 which is fastened to the assembly 60 by a small number of machine screws.

In previous incubation systems, the wiring of the fans and heating elements was done inside the chamber by an electrician standing on a ladder. For safety reasons, the electrician would be required to enclose the wires in a protective channel and then screw the channel to the ceiling of the chamber. This process is very awkward and, in many instances, wires would slip out of the channel and be pinched between the ceiling and the channel flange resulting in the channel having to be removed, reorganized and reinstalled. By the present invention, the electrician avoids this awkward process by being able to work on the roof of the incubator and only enter the chamber to plug the fans and heating elements into the electrical outlets in the base of the ceiling electrical outlet assembly 60. Moreover, should service be necessary to one of the electrical outlets, the electrician does not have to enter the chamber and remove the entire safety enclosure channel. Instead, all the work can be performed easily and efficiently from the incubator roof without having to enter the chamber and risk damaging the eggs or altering the internal environmental conditions.

From the above description it is apparent that the objectives of the present invention have been achieved. While only certain embodiments have been set forth, alternative embodiments and various modifications will be apparent from the above description to those skilled in the art. For example, the intake air flow control channel 32 need not be three sided but could be constructed of different configurations. These and other alternatives are considered equivalents and within the spirit and scope of the present invention.

What is claimed is:

1. A corner support member for connecting insulated ceiling and side wall panels in an incubation structure comprising, a flat horizontal member, two spaced, parallel vertical members subtending and extending the length of said horizontal member and a third vertical member disposed on the upper surface of said horizontal member extending the length of said horizontal member and bifurcating at its distal end to form a receptive boss, said first two vertical members cooperating with said horizontal member to form a channel for engaging the top edge of said side wall panels means, said third vertical member cooperating with said horizontal member to supportingly engage the side edge of said ceiling panel means, and a cover plate connected to said receptive boss for securing said ceiling panel means in place.

2. The corner support member as set forth in claim 1 wherein said horizontal member and third vertical member are arranged to support the ceiling panel means of two adjacent incubators sharing a common side wall and said cover plate securely locks both sets of ceiling panel means in place.

3. A ceiling electrical outlet assembly, for use in an incubation structure having ceiling panel means, comprising a first elongated channel member defined by a base portion and two opposed parallel side walls extending vertically from said base portion, a second elongated channel member defined by a second base portion comprising one of said side walls of said first channel member, and two opposed, parallel side walls extending from said second base portion, and a third channel member defined by a third base portion comprising said second side wall of said first channel member and two opposed, parallel side walls extending from said third base portion, wherein said second and third channel members receptively engage the opposing edges of two adjacent ceiling panel means and the first base portion of said first channel member has a plurality of apertures for installing electrical outlets for said environmental control means.

4. The ceiling electrical outlet assembly as set forth in claim 3 wherein the first base portion has a curved lip protruding into the incubation chamber, said lip extending the length of said first base portion for attaching a series of fans for circulating air within the incubation chamber.

5. A side wall gasket support member and gasket combination, for use in an incubation structure, having side wall panel means and housing racks of eggs for incubation, comprising a first receiving means for engaging a side wall panel means, a second receiving means for engaging an adjacent side wall panel means, a third receiving means and a vertical gasket slideably engaging said third receiving means for directing air circulation over the eggs by preventing air flow between said incubation structure side walls and said egg racks.

6. The incubator structure as set forth in claim 5 wherein said gasket comprises a base portion and an elongated finger portion, said third receiving means of said side wall gasket support member having a cross-sectional area shaped to receive said base portion of said gasket and an elongated slot through which said finger portion of said gasket extends.

7. A poultry egg incubation structure comprising a plurality of ceiling panel means, a plurality of side wall panel means, a front end panel means including at least one door, a rear end panel means including at least one door, joining means for interconnecting said ceiling panel means, side wall panel means and end panel means to form an incubation chamber, an air intake vent disposed in at least one of said ceiling panel means adjacent said front end panel means for permitting the flow of cool air to extend into said incubation chamber, an air exhaust vent disposed in at least one of said ceiling panel means adjacent said rear end panel means for permitting the exiting of air from within said chamber, environmental control means attachd to at least one of said ceiling panel means wear near said front end panel means for humidifying, heating and circulating air within said chamber, and an intake air flow control means including at least a vertically disposed front wall attached to said ceiling in communicating alignment with said air intake vent for receiving cool external air and introducing said cool external air into said chamber, said intake air flow control means being spaced from said front end panel means and having at least one substantially open side for controlling the mixing of cool external air with heated and humidified internal air by forcing the cool air to gradually disperse from said intake air flow control means initially in a direction away from the eggs in the incubation structure under the influence of said heated and humidified circulating air.

8. The incubation structure as set forth in claim 7 wherein said intake air flow control means comprises a generally tapered air flow conduit which has a larger cross sectional area at the top portion connected to said ceiling panel means compared to the cross sectional bottom portion extending toward the bottom of said chamber to manitain control over the cool, external air which is decreasing in volume as it gradually escapes around the sides of said channel.

9. The incubation structure as set forth in claim 7 wherein said joining means for interconncting said side wall panel means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulating in the chamber.

10. The incubator structure as set forth in claim 9 wherein said gasket comprises a base portion and an elongated finger portion, said third receiving means of said side wall gasket support member having a cross-sectional area shaped to receive said base portion of said gasket and an elongated slot through which said finger portion of said gasket extends.

11. The incubation structure as set forth in claim 9 further including a fourth receiving means for engaging the side edge of ceiling panel means associated with an adjacent incubation structure for allowing the two adjacent incubation structures to share a common side wall and bridging cover plate means for receptively securing said ceiling panel means of each incubation structure in place.

12. The incubation structure as set forth in claim 7 wherein said joining means includes a ceiling electrical outlet assembly comprising a first elongated channel member defined by a base portion and two opposed parallel side walls extending vertically from said base portion, a second elongated channel member defined by a second base portion comprising one of said side walls of said first channel member, and two opposed, parallel side walls extending from said second base portion, and a third channel member defined by a third base portion comprising said second side wall of said first channel member and two opposed, parallel side walls extending from said third base portion, wherein said second and third channel members receptively engage the opposing edges of two adjacent ceiling panel means and a plurality of apertures in said first base portion of said first channel member for installing electrical outlets for said environmental control means.

13. The incubation structure as set forth in claim 12 wherein said joining means for interconnecting said side wall panel means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulation in the chamber.

14. The incubator structure as set forth in claim 13 wherein said gasket comprises a base portion and an elongated finger portion, said third receiving means of said side wall gasket support member having a cross-sectional area shaped to receive said base portion of said gasket and an elongated slot through which said finger portion of said gasket extends.

15. The incubation structure as set forth in claim 7 wherein said joining means for connecting said ceiling panel means to said side wall panel means comprises a corner support member disposed between said ceiling and side wall panel means having a first receiving means for engaging the top edge of said wall panel means, a second receiving means for engaging the side edge of said ceiling panel means, a third receiving means and an outer edge cover member connected to said third receiving means for securing said ceiling panel means in place.

16. The incubation structure as set forth in claim 15 wherein said joining means includes a ceiling electrical outlet assembly comprising a first elongated channel member defined by a base portion and two opposed parallel side walls extending vertically from said base portion, a second elongated channel member defined by a second base portion comprising one of said side walls of said first channel member, and two opposed, parallel side walls extending from said second base portion, and a third channel member defined by a third base portion comprising said second side wall of said first channel member and two opposed, parallel side walls extending from said third base portion, wherein said second and third channel members receptively engage the opposing edges of two adjacent ceiling panel means and the first base portion of said first channel member has a plurality of apertures for installing electrical outlets for said environmental control means.

17. The incubation structure as set forth in claim 15 wherein said joining means includes a ceiling electrical outlet assembly comprising a first elongated channel member defined by a base portion and two opposed parallel side walls extending vertically from said base portion, a second elongated channel member defined by a second base portion comprising one of said side walls of said first channel member, and two opposed, parallel side walls extending from said second base portion, and a third channel member defined by a third base portion comprising said second side wall of said first channel member and two opposed, parallel side walls extending from said third base portion, wherein said second and third channel members receptively engage the opposing edges of two adjacent ceiling panel means and the first base portion of said first channel member has a plurality of apertures for installing electrical outlets for said environmental control means.

18. The incubation structure as set forth in claim 17 wherein said joining means for interconnecting said side wall panel means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulation in the chamber.

19. The incubator structure as set forth in claim 18 wherein said gasket comprises a base portion and an elongated finger portion, said third receiving means of said side wall gasket support member having a cross-sectional area shaped to receive said base portion of said gasket and an elongated slot through which said finger portion of said gasket extends.

20. The incubation structure as set forth in claim 15 wherein said joining means for interconnecting said side wall panel means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulation in the chamber.

21. The incubator structure as set forth in claim 20 wherein said gasket comprises a base portion and an elongated finger portion, said third receiving means of said side wall gasket support member having a cross-sectional area shaped to receive said base portion of said gasket and an elongated slot through which said finger portion of said gasket extends.

22. A poultry egg incubation structure comprising a plurality of ceiling panel means, a plurality of side wall panel means, a front end panel means including at least one door, a rear end panel means including at least one door, joining means for interconnecting said ceiling panel means, side wall panel means and end panel means to form an incubation chamber, wherein said joining means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulation in the chamber, an air intake vent disposed in at least one of said ceiling panel means adjacent said front end panel means for permitting the flow of cool air to extend into said incubation chamber, an air exhaust vent disposed in at least one of said ceiling panel means adjacent said rear end panel means for permitting the exiting of air from within said chamber, environmental control means attached to at least one of said ceiling panel means near said front end panel means for humidifying, heating and circulating air within said chamber, and an intake air flow control means including at least a vertically disposed front wall attached to said ceiling in communicating alignment with said air intake vent for receiving cool external air and introducing said cool external air into said chamber, said intake air flow control means being spaced from sid front end panel means and having at least one substantially open side for controlling the mixing of cool external air with heated and humified internal air by forcing the cool air to gradually disperse from said intake air flow control means initially in a direction away from the eggs in the incubation structure under the influence of said heated and humidified circulating air.

23. The incubator structure as set forth in claim 22 wherein said gasket comprises a base portion and an elongated finger portion, said third receiving means of said side wall gasket support member having a cross-sectional area shaped to receive said base portion of said gasket and an elongated slot through which said finger portion of said gasket extends.

24. A poultry egg incubation structure comprising a plurality of ceiling panel means, a plurality of side wall panel means, a front end panel means including at least one door, a rear end panel means including at least one door, joining means for interconnecting said ceiling panel means, side wall panel means and end panel means to form an incubation chamber, wherein said joining means includes a ceiling electrical outlet comprising a first elongated channel member defined by a base portion and two opposed parallel side walls extending vertically from said base portion, a second elongated channel member defined by a second base portion comprising one of said side walls of said first channel member, and two opposed, parallel side walls extending from said second base portion, and a third channel member defined by a third base portion comprising said second side wall of said first channel member and two opposed, parallel side walls extending from said third base portion, wherein said second and third channel members receptively engage the opposing edges of two adjacent ceiling panel means and a plurality of apertures in the first base portion of said first channel member for installing electrical outlets for said environmental control means, an air intake vent dispoed in at least one of said ceiling panel means adjacent said front end panel means for permitting the flow of cool air to extend into said incubation chamber, an air exhaust vent disposed in at least one of said ceiling panel means adjacent said rear end panel means for permitting the exiting of air from within said chamber, environmental conrol means attached to at least one of said ceiling panel means near front end panel means for humidifying, heating and circulating air within said chamber, and an intake air flow control means including at least a vertically disposed front wall attached to said ceiling in communicating alignment with said air intake vent for receiving cool external air and introducing said cool external air into said chamber, said intake air flow control means being spaced from said front end panel and having at least one substantially open side for controlling the mixing of cool external air with heated and humidified internal air by forcing the cool air to gradually disperse from said intake air flow contol means initially in a direction away from the eggs in the incubation structure under the influence of said heated and humidified circulating air.

25. The incubation structure as set forth in claim 24 wherein said joining means for interconnecting said side wall panel means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulation in the chamber.

26. The incubator structure as set forth in claim 25 wherein said gasket comprises a base portion and an elongated finger portion, said third receiving means of said side wall gasket support member having a cross-sectional area shaped to receive said base portion of said gasket and an elongated slot through which said finger portion of said gasket extends.

27. A poultry egg incubation structure comprising a plurality of ceiling panel means, a plurality of side wall panel means, a front end panel means including at least one door, a rear end panel means including at least one door, joining means for interconnecting said ceiling panel means, side wall panel means and end panel means to form an incubation chamber, wherein said joining means for connecting said ceiling panel means to said side wall means comprises a corner support member disposed between said ceiling and side wall panel means having a first receiving means for engaging the top edge of said wall panel means, a second receiving means for engaging the side edge of said ceiling panel means, a third receiving means and an outer edge cover member connected to said third receiving means for securing said ceiling panel means in place, an air intake vent disposed in at least one of said ceiling panel means adjacent said front end panel means for permitting the flow of cool air to extend into said incubation chamber, an air exhaust vent disposed in at least one of said ceiling panel means adjcent said rear end panel means for permitting the exiting of air from within said chamber, environmental control means attached to at least one of said ceiling panel means near said front end panel means for humidifying, heating and circulating air within said chamber, and an intake air flow control means including at least a vertically disposed front wall attached to said ceiling in communicating alignment with said air intake vent for receiving cool external air and introducing said cool external air into said chamber, said intake air flow control means being spaced fom said front end panel means and having at least one substantially open side for controlling the mixing of cool external air with heated and humidified internal air by forcing the cool air to gradually disperse from said intake air flow control means initially in a direction away from the eggs in the incubation structure under the influence of said heated and humidified circulating air.

28. The incubation structure as set forth in claim 27 wherein said joining means for interconnecting said side wall panel means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulation in the chamber.

29. The incubator structure as set forth in claim 28 wherein said gasket comprises a base portion and an elongated finger portion, said third receiving means of said side wall gasket support member having a cross-sectional area shaped to receive said base portion of said gasket and an elongated slot through which said finger portion of said gasket extends.

30. The incubation structure as set forth in claim 27 wherein said joining means includes a ceiling electrical outlet assembly comprising a first elongated channel member defined by a base portion and two opposed parallel side walls extending vertically from said base portion, a second elongated channel member defined by a second base portion comprising one of said side walls of said first channel member, and two opposed, parallel side walls extending from said second base portion, and a third channel member defined by a third base portion comprising said second side wall of said first channel member and two opposed, parallel side walls extending from said third base portion, wherein said second and third channel members receptively engage the opposing edges of two adjacent ceiling panel means and the first base portion of said first channel member has a plurality of apertures for installing electrical outlets for said environmental control means.

31. The incubation structure as set forth in claim 30 wherein said joining means for interconnecting said side wall panel means includes a side wall gasket support member disposed between two adjacent side wall panel means having a first receiving means for engaging a side wall panel means, a second receiving means for engaging an adjacent side wall panel means, a third receiving means and a vertical gasket slideably engaging said third receiving means for directing air circulation in the chamber.

32. The incubator structure as set forth in claim 31 wherein said gasket comprises a base portion and an elongated finger portion, said third receiving means of said side wall gasket support member having a cross-sectional area shaped to receive said base portion of said gasket and an elongated slot through which said finger portion of said gasket extends.

* * * * *

UNITED STATES PATENT AND TRADEMARK OFFICE
CERTIFICATE OF CORRECTION

PATENT NO. : 4,706,608
DATED : November 17, 1987
INVENTOR(S) : Matthew R. Foster It is certified that error appears in the above-identified patent and that said Letters Patent is hereby corrected as shown below:

In claim 7, column 10, line 63, delete "wear".
In claim 8, column 11, line 17, delete "manitain", and insert --maintain--.
In claim 9, column 11, line 21, delete "interconncting", and insert --interconnecting--.
In claim 9, column 11, line 28, delete "circulating", and insert --circulation--.
In claim 22, column 13, line 54, delete "sid", and insert --said--.
In claim 24, column 14, line 8, following the word "outlet", insert --assembly--.
In claim 24, column 14, line 31, after the word "near", insert --said--.
In claim 24, column 14, line 39, following the word "panel", insert --means--.
In claim 27, column 15, line 4, after the word "wall", insert --panel--.
In claim 27, column 15, line 16, delete "adjcent", and insert --adjacent--.
In claim 27, column 15, line 26, delete "fom" and insert --from--.

Signed and Sealed this

Fourteenth Day of June, 1988

Attest:

DONALD J. QUIGG

*Attesting Officer*  *Commissioner of Patents and Trademarks*